United States Patent
Salter et al.

(10) Patent No.: US 10,106,074 B2
(45) Date of Patent: Oct. 23, 2018

(54) VEHICLE LAMP SYSTEM

(71) Applicant: Ford Global Technologies, LLC, Dearborn, MI (US)

(72) Inventors: Stuart C. Salter, White Lake, MI (US); Cornel Lewis Gardner, Romulus, MI (US); Paul Kenneth Dellock, Northville, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/371,685

(22) Filed: Dec. 7, 2016

(65) Prior Publication Data

US 2018/0154823 A1 Jun. 7, 2018

(51) Int. Cl.
| | |
|---|---|
| *B60Q 1/26* | (2006.01) |
| *B60R 1/12* | (2006.01) |
| *B60Q 1/32* | (2006.01) |
| *B60R 1/074* | (2006.01) |
| *B60R 13/00* | (2006.01) |

(52) U.S. Cl.
CPC ........... *B60Q 1/2665* (2013.01); *B60Q 1/323* (2013.01); *B60R 1/074* (2013.01); *B60R 13/005* (2013.01)

(58) Field of Classification Search
CPC ...... B60Q 1/2665; B60Q 1/2696; B60Q 1/32; B60Q 1/323; B60R 1/1207; B60R 13/0005
USPC .................................................. 362/494, 545
See application file for complete search history.

(56) References Cited

U.S. PATENT DOCUMENTS

| | | | |
|---|---|---|---|
| 2,486,859 A | 11/1949 | Meijer et al. | |
| 5,053,930 A | 10/1991 | Benavides | |
| 5,434,013 A | 7/1995 | Fernandez | |
| 5,709,453 A | 1/1998 | Krent et al. | |
| 5,839,718 A | 11/1998 | Hase et al. | |
| 6,031,511 A | 2/2000 | DeLuca et al. | |
| 6,117,362 A | 9/2000 | Yen et al. | |
| 6,260,988 B1 | 7/2001 | Misawa et al. | |
| 6,276,821 B1 * | 8/2001 | Pastrick ............... | B60Q 1/2665 362/141 |
| 6,294,990 B1 | 9/2001 | Knoll et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason M Han
(74) *Attorney, Agent, or Firm* — Jason Rogers; Price Heneveld LLP (57) ABSTRACT

A vehicle mirror assembly is provided herein. The mirror assembly includes a housing. A first light source is disposed within the housing and is operably coupled with a first light output window disposed on an inboard portion of the housing. A second light source is disposed within the housing and is operably coupled with a second light output window disposed on a bottom portion of the housing. A third light source is disposed within the housing and is operably coupled with a third light output window disposed on an outboard portion of the housing.

20 Claims, 8 Drawing Sheets

(56) References Cited

U.S. PATENT DOCUMENTS

| | | |
|---|---|---|
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,354,182 B2 | 4/2008 | Bartels |
| 7,441,914 B2 | 10/2008 | Palmer et al. |
| 7,458,698 B2 | 12/2008 | Heathcock et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,876,205 B2 | 1/2011 | Catten et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,103,414 B2 | 1/2012 | Boss et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,765 B2 | 4/2013 | Kuhlman et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,764,256 B2 * | 7/2014 | Foote ................. B60R 1/12 362/494 |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,922,388 B2 | 12/2014 | Nykerk |
| 8,937,454 B2 | 1/2015 | Baarman et al. |
| 8,952,341 B2 | 2/2015 | Kingsley et al. |
| 8,963,705 B2 | 2/2015 | Miller et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,194,168 B1 | 11/2015 | Lu et al. |
| 9,299,887 B2 | 3/2016 | Lowenthal et al. |
| 9,315,148 B2 | 4/2016 | Schwenke et al. |
| 9,442,888 B2 | 9/2016 | Stanfield et al. |
| 9,568,659 B2 | 2/2017 | Verger et al. |
| 9,579,987 B2 | 2/2017 | Penilla et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2005/0207041 A1 | 9/2005 | Apfelbeck |
| 2006/0087826 A1 | 4/2006 | Anderson, Jr. |
| 2006/0097121 A1 | 5/2006 | Fugate |
| 2007/0030136 A1 | 2/2007 | Teshima et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2008/0285293 A1 | 11/2008 | Sato |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0020101 A1 | 1/2012 | Pastrick et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0009855 A1 | 1/2013 | Gally et al. |
| 2013/0050979 A1 | 2/2013 | Van De Ven et al. |
| 2013/0092965 A1 | 4/2013 | Kijima et al. |
| 2013/0154821 A1 | 6/2013 | Miller et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0198515 A1 | 7/2014 | Tulio et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0288832 A1 | 9/2014 | Hoch et al. |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0175057 A1 * | 6/2015 | Salter ................. B60Q 1/32 362/510 |
| 2015/0267881 A1 | 9/2015 | Salter et al. |
| 2015/0307033 A1 | 10/2015 | Preisler et al. |
| 2015/0324708 A1 | 11/2015 | Skipp et al. |
| 2015/0339928 A1 | 11/2015 | Ramanujam |
| 2015/0346727 A1 | 12/2015 | Ramanujam |
| 2015/0366036 A1 | 12/2015 | Luostarinen |
| 2016/0016506 A1 | 1/2016 | Collins et al. |
| 2016/0082880 A1 | 3/2016 | Co et al. |
| 2016/0102819 A1 | 4/2016 | Misawa et al. |
| 2016/0131327 A1 | 5/2016 | Moon et al. |
| 2016/0214535 A1 | 7/2016 | Penilla et al. |
| 2016/0236613 A1 | 8/2016 | Trier |

(56) References Cited

U.S. PATENT DOCUMENTS

2017/0158125 A1 6/2017 Schuett et al.
2017/0213165 A1 7/2017 Stauffer et al.

FOREIGN PATENT DOCUMENTS

| CN | 201193011 Y | 2/2009 |
|---|---|---|
| CN | 202357840 U | 8/2012 |
| CN | 204127823 U | 1/2015 |
| CN | 104869728 A | 8/2015 |
| CN | 105303642 A | 2/2016 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2719580 A1 | 4/2014 |
| EP | 2778209 A1 | 9/2014 |
| JP | 2000052859 A | 2/2000 |
| JP | 2000159011 A | 6/2000 |
| JP | 2005035521 A | 2/2005 |
| JP | 2007238063 A | 9/2007 |
| JP | 2015016708 A | 1/2015 |
| KR | 20060026531 A | 3/2006 |
| WO | 2006047306 A1 | 5/2006 |
| WO | 2008093266 A1 | 8/2008 |
| WO | 2014068440 A1 | 5/2014 |
| WO | 2014161927 A1 | 10/2014 |
| WO | 2016012651 A1 | 1/2016 |

\* cited by examiner

VEHICLE LAMP SYSTEM

FIELD OF THE INVENTION

The present disclosure generally relates to vehicle lighting systems, and more particularly, to exterior vehicle lighting systems.

BACKGROUND OF THE INVENTION

Exterior illumination offers a unique and attractive viewing experience as an occupant approaches a vehicle. It is therefore desired to implement such structures in automotive vehicles for various lighting applications.

SUMMARY OF THE INVENTION

According to one aspect of the present disclosure, a vehicle mirror assembly is disclosed. The vehicle mirror assembly includes an exterior housing. A first light source is disposed within the housing and is operably coupled with a first light output window disposed on an inboard portion of the housing. A second light source is disposed within the housing and is operably coupled with a second light output window disposed on a bottom portion of the housing. A third light source is disposed within the housing and is operably coupled with a third light output window disposed on an outboard portion of the housing.

According to another aspect of the present disclosure, a vehicle mirror assembly is disclosed. The vehicle mirror assembly includes a housing coupled to a mount and operable between deployed and folded positions. First and second light output windows are defined by the housing. A first light source emits excitation light through the first light output window when the housing is in the folded position. A second light source emits excitation light through the second light output window when the housing is in the deployed position.

According to yet another aspect of the present disclosure, a vehicle lamp assembly is disclosed. The vehicle lamp assembly includes a housing attached to a vehicle and operable between folded and deployed positions. A first light output window is disposed on an inboard portion of the housing. A second light output window is disposed on an outboard portion of the housing. The first and second light output windows emit light vehicle forwardly and vehicle rearwardly of the housing when the housing is in the folded position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
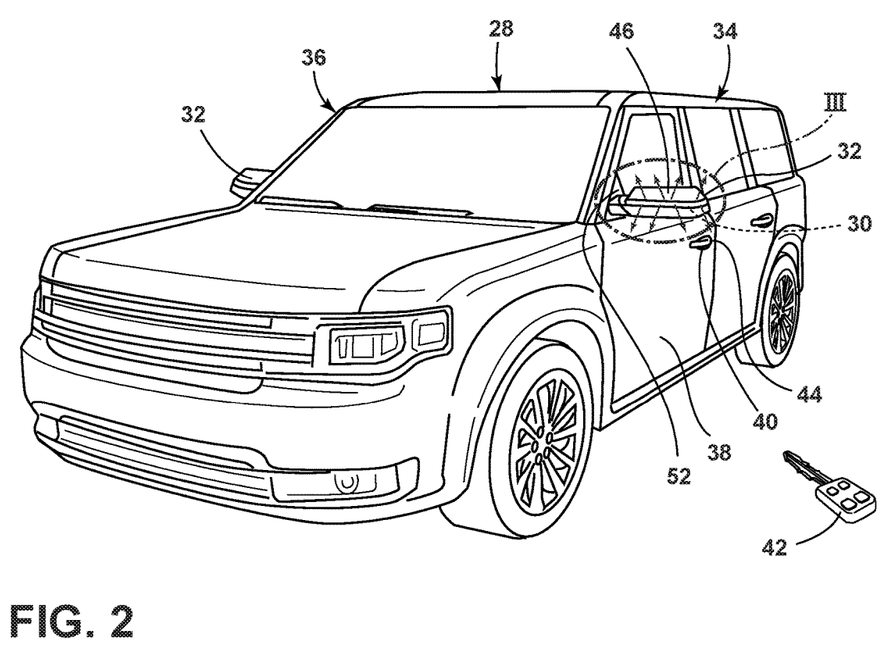
FIG. 2 is a front perspective view of an automotive vehicle employing a lamp assembly in an exterior mirror assembly of the vehicle, according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a light system. The light system may advantageously employ one or more phosphorescent and/or luminescent structures to illuminate in response to predefined events. The one or more luminescent structures may be configured to convert ambient light and/or light received from an associated light source and re-emit the light at a different wavelength typically found in the visible spectrum.

Figure 1A:
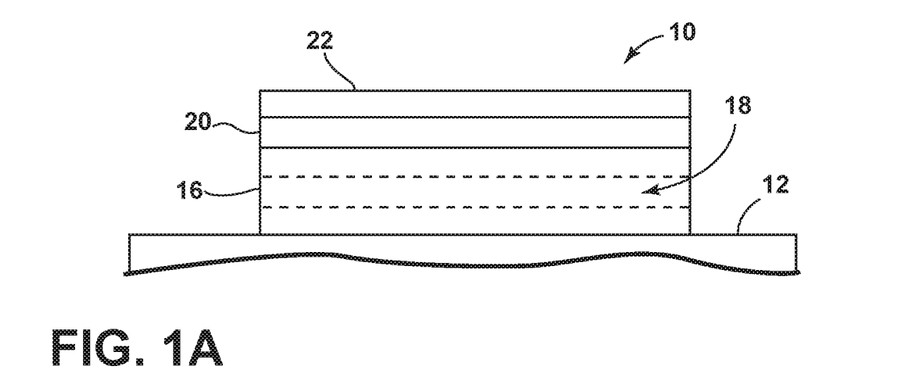
FIG. 1A is a side view of a luminescent structure rendered as a coating for use in a luminescent latch assembly according to one embodiment.
Figure 1B:
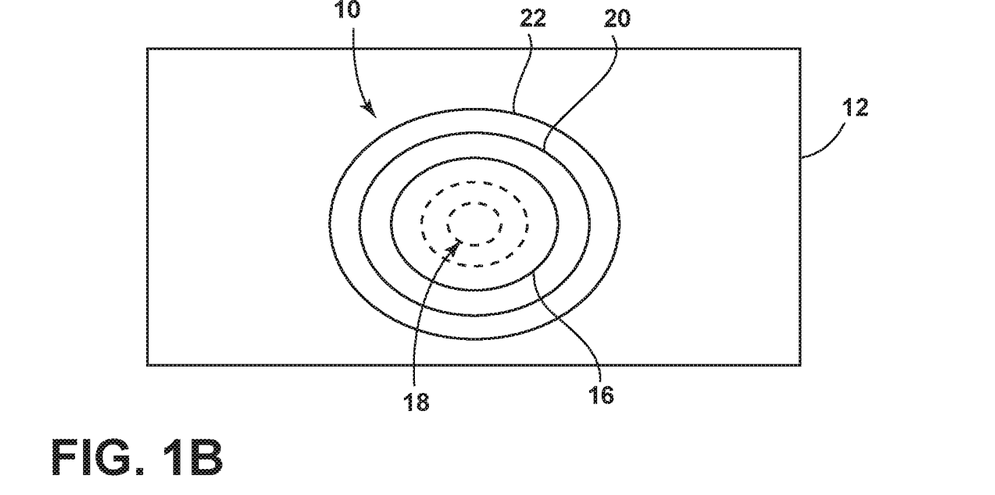
FIG. 1B is a top view of a luminescent structure rendered as a discrete particle according to one embodiment.
Figure 1C:
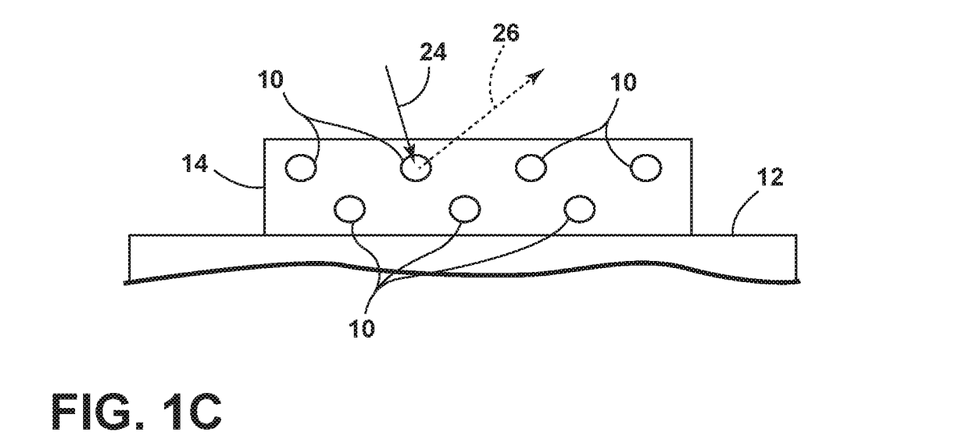
FIG. 1C is a side view of a plurality of luminescent structures rendered as discrete particles and incorporated into a separate structure.

Referring to FIGS. 1A-1C, various exemplary embodiments of luminescent structures 10 are shown, each capable of being coupled to a substrate 12, which may correspond to a vehicle fixture or vehicle related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown through broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 62 (FIG. 4) may be referred to herein as excitation light 24 and is illustrated herein as solid arrows. In contrast, light emitted from the luminescent structure 10 may be referred to herein as converted light 26 and may be illustrated herein as broken arrows.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of luminescent structures 10 is disclosed in U.S. Pat. No. 8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat. No. 9,057,021 to Kingsley et al., and U.S. Pat. No. 8,846,184 to Agrawal et al., all of which are incorporated herein by reference in its entirety.

According to one embodiment, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in some embodiments, the rare earth aluminum garnet type Ce phosphor may serve as the luminescent material 18 with ultra-short-persistence characteristics, which can emit the converted light 26 by absorbing purple to blue excitation light 24 emitted from the light sources 62. According to one embodiment, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein. Additional information regarding the production of short-persistence luminescent materials is disclosed in U.S. Pat. No. 8,163,201 to Kingsley et al., the entire disclosure of which is incorporated herein by reference.

Additionally, or alternatively, the luminescent material 18, according to one embodiment, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light sources 62). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to one embodiment, may be operable to emit light at or above an intensity of 0.32 mcd/m² after a period of 10 minutes. Additionally, the long-persistence luminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long-persistence luminescent material 18 may continually illuminate in response to excitation from any light sources 62 that emit the excitation light 24, including, but not limited to, natural light sources (e.g., the sun) and/or any artificial light sources 62. The periodic absorption of the excitation light 24 from any excitation source may provide for a substantially sustained charge of the long-persistence luminescent material 18 to provide for consistent passive illumination. In some embodiments, a light sensor may monitor the illumination intensity of the luminescent structure 10 and actuate an excitation source when the illumination intensity falls below 0.32 mcd/m², or any other predefined intensity level.

The long-persistence luminescent material 18 may correspond to alkaline earth aluminates and silicates, for example doped di-silicates, or any other compound that is capable of emitting light for a period of time once the excitation light 24 is no longer present. The long-persistence luminescent material 18 may be doped with one or more ions, which may correspond to rare earth elements, for example, $Eu^{2+}$, $Tb^{3+}$ and/or $Dy^3$. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to one embodiment, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Additional information regarding the production of long-persistence luminescent materials is disclosed in U.S. Pat. No. 8,163,201 to Agrawal et al., the entire disclosure of which is incorporated herein by reference. For additional information regarding long-persistence phosphorescent structures, refer to U.S. Pat. No. 6,953,536 to Yen et al., U.S. Pat. No. 6,117,362 to Yen et al., and U.S. Pat. No. 8,952,341 to Kingsley et al., all of which are incorporated herein by reference in their entirety.

Figure 3:
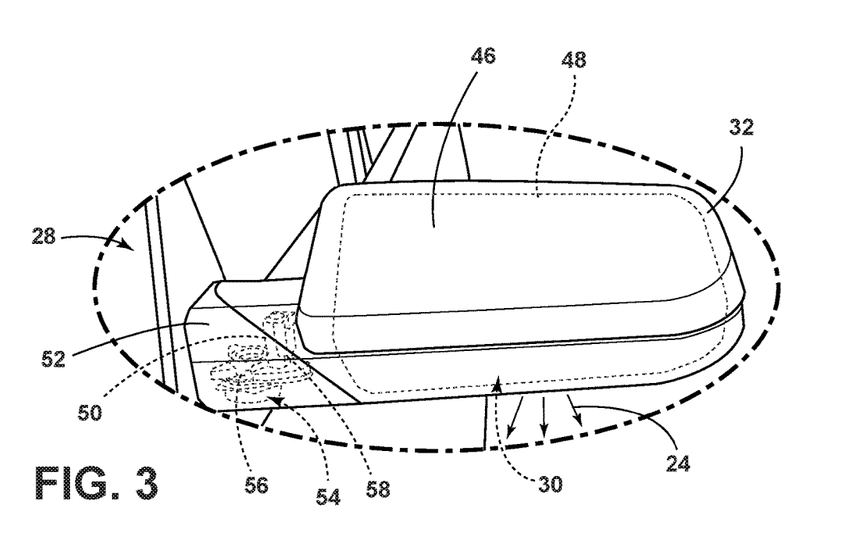
FIG. 3 is an enlarged view of section III of FIG. 2 illustrating the exterior mirror assembly with a plurality of light sources disposed within the lamp assembly.

Referring to FIGS. 2 and 3, an automotive vehicle 28 is generally illustrated employing a lamp assembly 30, according to one embodiment. The vehicle 28 shown is one example of an occupant vehicle 28 having a pair of exterior rearview mirror assemblies 32 mounted on opposite lateral side portions 34, 36 of the vehicle 28 generally near the front side of the front occupant doors 38, as is generally known in the art. Occupant doors 38 each include a handle 40 with a latch mechanism to enable an occupant to engage and unlatch the latch mechanism to open the door 38 for access to enter and exit the vehicle 28. A remote key fob 42 is shown which may be operated by an occupant to activate various features including door lock and unlock functions. The handle 40 is shown including a proximity sensor 44, such as a capacitive sensor, for sensing the hand of the occupant in close proximity to the handle 40.

The exterior mirror assembly 32 may include a housing 46 and a reflective element 48. The housing 46 may include an opening for enclosing the reflective element 48. The reflective element 48 may be used for viewing an area laterally adjacent and/or rearwardly of the vehicle 28. The housing 46 may include a tilt actuator (not shown) therein for providing an occupant of the vehicle 28 with an adjustable view.

The housing 46 may be operably coupled with a pivot assembly 50 that is used to connect the housing 46 to a mirror bracket 52. The vehicle bracket 52 is secured to the vehicle 28, and the pivot assembly 50 is used to connect the housing 46 securely to the vehicle 28. While the mirror assembly 32 is illustrated on a driver's side portion 34 of the vehicle 28, it will be understood that the mirror described herein may be disposed on either lateral side portion 34, 36, or any other portion, of the vehicle 28 without departing from the scope of the present disclosure.

Figure 8:
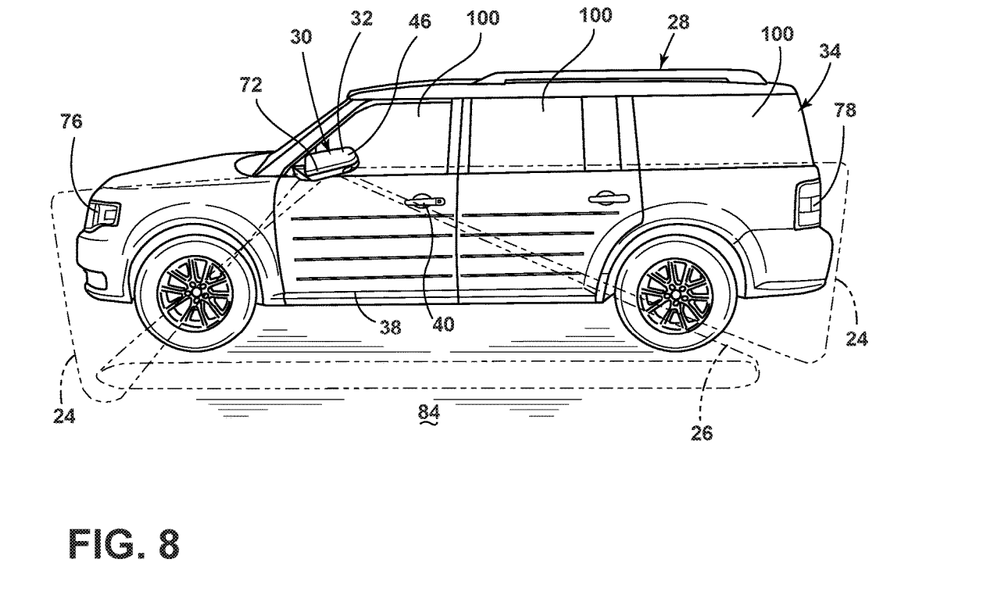
FIG. 8 is a side plan view of the vehicle having the mirror assembly in a folded position, according to one embodiment.

The housing 46 is operable between a deployed position (FIG. 2) and a folded position (FIG. 8). In some embodiments, the pivot assembly 50 is electronically controlled and includes a pivot drive assembly 54 adapted for supporting a drive motor 56 and a transmission assembly 58.

Figure 7:
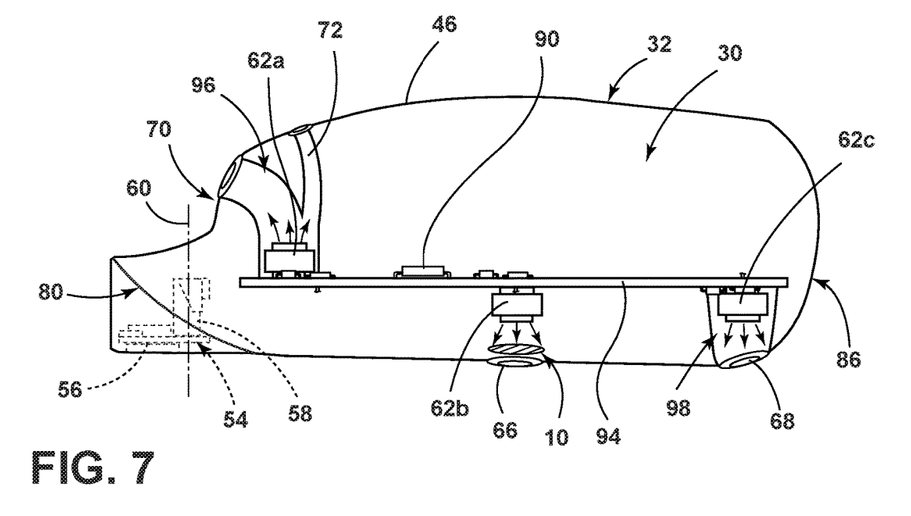
FIG. 7 is a side cross-sectional view of the exterior mirror assembly taken along the line VII-VII of FIG. 6, illustrating the lamp assembly having a plurality of light sources and light guides, according to one embodiment.

The drive motor 56 may be electrically powered through the vehicle electrical system, and controlled by a suitable switching device, which may incorporate digital microprocessor-based logic devices. The transmission assembly 58 is adapted to convert the rotation of the drive motor shaft (not shown) to controlled rotation of the housing 46 about an axis of rotation 60 (FIG. 7). The drive motor 56 may alter the position of the mirror assembly 32 automatically based on a predefined vehicle event, such as an engine of the vehicle 28 being disposed in the ON and/or OFF state and/or a welcome or farewell sequence, meaning that the illumination may occur as an occupant of the vehicle 28 leaves and/or approaches the vehicle 28 employing the mirror assembly 32. Additionally, and/or alternatively, the mirror assembly 32 may be rotated based on any other predefined event.

Additionally still, the mirror assembly 32 may be rotated based on actuation of a switch by an occupant of the vehicle 28. The switch may be disposed within the vehicle 28 and/or on the key fob 42 of the vehicle 28. Additionally still, the mirror assembly 32 may be operably coupled with any other system and/or sensor within the vehicle 28 such that the mirror assembly 32 may be rotated based on actuation of that system or sensor.

Figure 4:
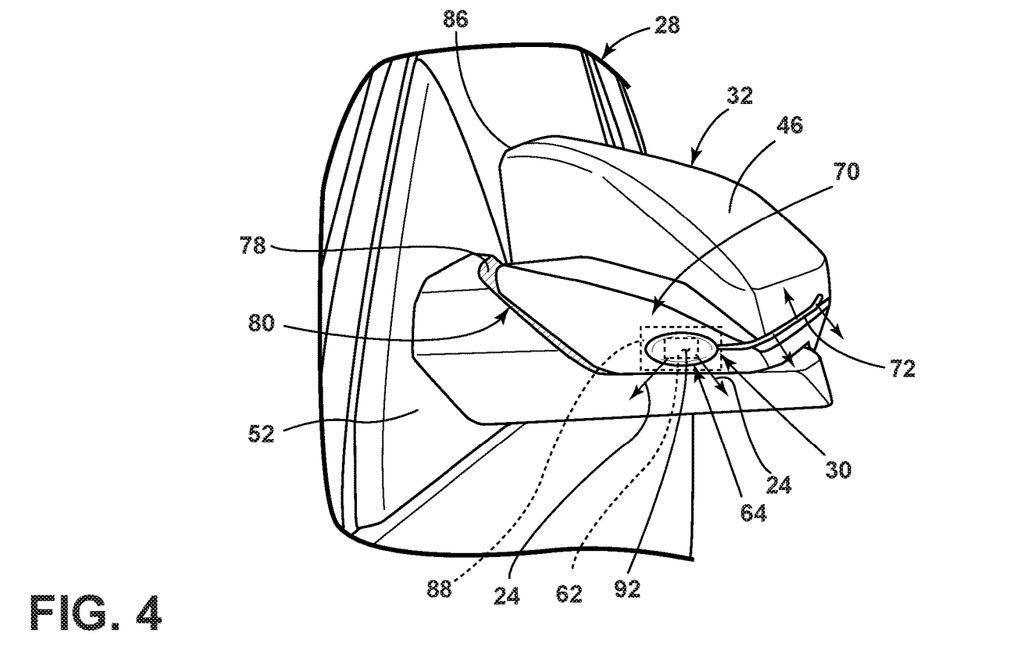
FIG. 4 is a front perspective view of the exterior mirror assembly, according to one embodiment, in a folded position.
Figure 5:
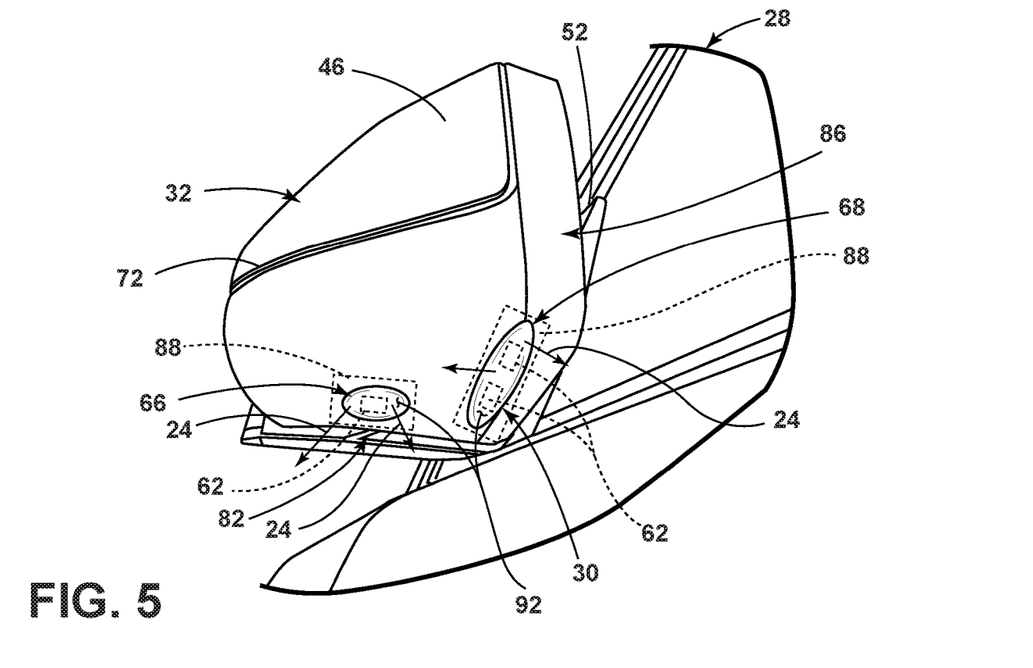
FIG. 5 is a rear perspective view of the exterior mirror assembly of FIG. 4 in the folded position.
Figure 6:
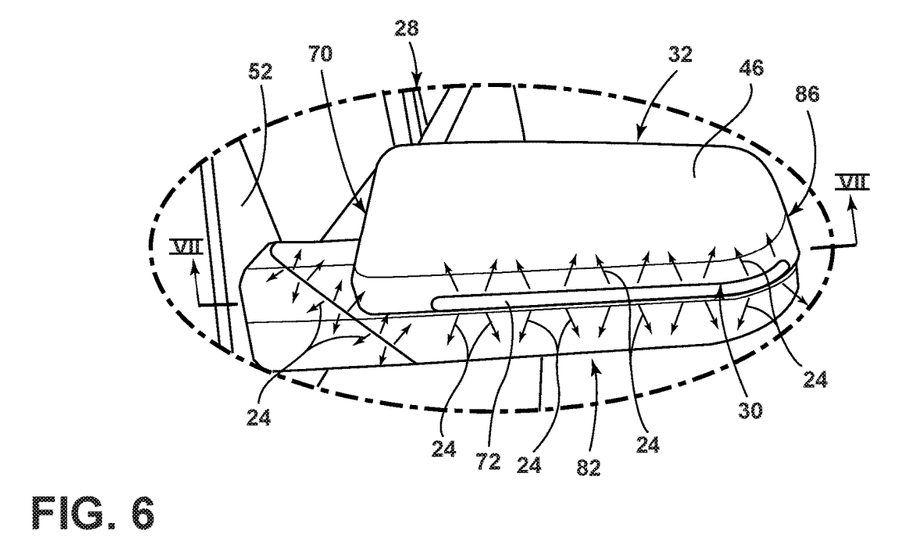
FIG. 6 is an enlarged view of section III of FIG. 2 illustrating the exterior mirror assembly with a housing light guide disposed along a front portion of the exterior mirror assembly, according to one embodiment.

Referring to FIGS. 4-6, the lamp assembly 30 is installed within the housing 46 and is configured to project excitation light 24 outwardly from the housing 46. Accordingly, the lamp assembly 30 may include the one or more light sources 62 within the housing 46 of the mirror assembly 32. The light sources 62 may be operably coupled with one or more output windows 64, 66, 68 that are configured to direct light in a predefined direction.

As illustrated in FIGS. 4-6, a first light output window 64 is disposed on an inboard portion 70 of the housing 46 and is operably coupled with one or more light sources 62. The inboard portion 70 of the housing 46 is proximate the vehicle 28 when the housing 46 is in the deployed position. Accordingly, the first light output window 64 may be concealed in a vehicle side-to-side (lateral) direction and/or face the vehicle 28 when the mirror assembly 32 is in the deployed position. The first light output window 64 may face vehicle forwardly when the mirror assembly 32 is in the folded position. Moreover, a housing light guide 72 may be operably coupled with the first light output window 64 and/or light sources 62 that are configured to emit excitation light 24 through the first light output window 64.

The excitation light 24 emitted through the housing light guide 72 may be used as a turn signal, a puddle lamp, ambient lighting, feature lighting, and/or for any other function. A controller 90 (FIG. 77) within the vehicle 28 communicates and/or controls vehicle equipment including, but not limited to, headlights 76, taillights 78 (FIG. 8), a turn signaling device (e.g., turn signal lever 74 (FIG. 9)), and/or hazard switch. In operation, the headlights 76, the taillights 78, and/or the one or more light sources 62 that are operably coupled with the housing light guide 72 are actuated based on a vehicle status signal. For example, the controller 90 may generate a hazard signal when the hazard switch is in an ON state. In such an instance, the hazard signal may prompt the headlights 76 and taillights 78 to blink in unison. Additionally, the one or more light sources 62 that are operably coupled with the housing light guide 72 may notify approaching vehicles of the hazard signal. Likewise, when the turn signal lever 74 is actuated, the headlights 76, the taillights 78, the housing light guide 72, and/or first light output window 64 that correspond to a lateral side portion 34, 36 of the vehicle 28 of the turn signal lever 74 may also illuminate and/or blink in any desired pattern.

A portion of the mirror bracket 52 that is proximate to the first light output window 64 in the deployed position may include a reflective material thereon. Thus, a gap 80 between the housing 46 and the mirror bracket 52 may emit excitation light 24 in conjunction with the housing light guide 72. The illumination of the gap 80 may provide aesthetic benefits along with notifying the driver that at least one light source within the housing 46 is activated. The at least one light source may illuminate in conjunction with a turn signal lever 74 thereby notifying the driver when the turn signal lever 74 is actuated.

A second light output window 66 is disposed on a bottom portion 82 of the housing 46. The second light output window 66 is operably coupled with one or more light sources 62 that illuminate below the housing 46. Accordingly, the second light output window 66 may serve as a puddle lamp that illuminates a ground surface 84 (FIG. 8) adjacent to the vehicle 28 to enable the occupant to approach and access the vehicle 28 and view the ground surface 84 proximate thereto.

A third light output window 68 may be disposed on an outboard portion 86 of the housing 46 and is likewise operably coupled with one or more light sources 62. The third light output window 68 is configured to direct light vehicle rearwardly of the housing 46 when the housing 46 is in the folded position and vehicle outwardly in the deployed position.

With respect to the embodiments described herein, the light sources 62 may each be configured to emit visible and/or non-visible light, such as blue light, UV light, infrared, and/or violet light and may include any form of light source. For example fluorescent lighting, light emitting diodes (LEDs), organic LEDs (OLEDs), polymer LEDs (PLEDs), laser diodes, quantum dot LEDs (QD-LEDs), solid-state lighting, a hybrid of these or any other similar device, or any other form of lighting. In some embodiments, the light sources 62 may be configured to emit a wide range of wavelengths of light thereby providing illumination in a plurality of colors.

The lamp assembly 30 may include a plurality of printed circuit boards (PCB) 88 operably coupled with the controller 90, or controllers, having control circuitry including LED drive circuitry for controlling activation and deactivation of the light sources 62. The PCBs 88 may be any type of circuit board including, but not limited to, any flexible PCB and/or rigid PCB. The PCBs 88 may be fixed within the housing 46 through any means known in the art, including, but not limited to, adhesives and/or fasteners.

Each light output window 64, 66, 68 may include a lens 92 that may be formed in any manner to direct light in a desired direction and/or towards a desired feature of the vehicle 28. For example, the lens 92 may be configured as a Fresnel lens, a pillow optic, and/or any other type of lens or optic that is configured to disperse, concentrate, and/or otherwise direct light emitted from the light sources 62 therethrough in any desired manner.

Referring still to FIGS. 4-6, some of the light output windows (e.g., 66) of the lamp assembly 30 may have the luminescent structure 10 therein and/or thereon for converting excitation light 24 to a converted light 26. In any event, the light output windows 64, 66, 68 may be light transmissive such that light from each respective light source may pass therethrough.

Referring to FIG. 7, three light sources 62a, 62b, 62c are configured in a linear array and disposed on a single PCB 94. To direct light towards the three light output windows 64, 66, 68, the three light sources 62a, 62b, 62c may be operably coupled with one or more light guides 96, 98. A first light source 62a may be operably coupled with a first light guide 96 that is configured to direct light towards the first light output widow. The first light guide 96 may also be integrally formed with the housing light guide 72 such that light emitted from the first light source 62a is directed towards the first output widow and along the housing 46 simultaneously.

A second light source 62b may be operably coupled with the second light output window 66. The second light source 62b may be disposed on an opposing side of the PCB 94 from the first light source 62a. As discussed above, the second light output widow 66, or any other light output window 64, 68 disposed within the housing 46, may include the luminescent structure 10 thereon and/or therein. In operation, the second light source 62b, and/or any other light source 62a, 62c that is operably coupled with the luminescent structure 10, may be configured to emit excitation light 24 towards the luminescent structure 10. The luminescent structure 10, which may be disposed on a badge 102 (FIG. 10), luminesces in response to receiving the excitation light 24. The wavelength of the excitation light 24 may differ in length from that of the converted light 26 that is emitted from the luminescent structure 10.

A third light source 62c may be operably coupled with a second light guide 98. The second light guide 98 may be configured to direct light towards the third light output window 68. The light guides 96, 98 described herein may be formed from a rigid material that is comprised of a curable substrate such as a polymerizable compound, a mold in clear (MIC) material or mixtures thereof. Acrylates are also commonly used for forming rigid light pipes, as well as poly methyl methacrylate (PMMA), which is a known substitute for glass. A polycarbonate material may also be used in an injection molding process to form the rigid light guides. Further, the light guides 96, 98 may be a flexible light guide, wherein a suitable flexible material is used to create the light guides 96, 98. Such flexible materials include urethanes, silicone, thermoplastic polyurethane (TPU), or other like optical grade flexible materials. Whether the light guides 96, 98 are flexible or rigid, the light guides 96, 98, when formed, are substantially optically transparent and/or translucent and capable of transmitting excitation light 24. The light guides 96, 98 may be referred to as a light pipe, a light plate, a light bar or any other light carrying or transmitting substrate made from a clear or substantially translucent material.

While three light sources 62a, 62b, 62c are shown and described herein as part of the lamp assembly 30, it will be appreciated that one or more light sources 62 may be employed in various configurations and orientations that are operably coupled with one or more light output windows 64, 66, 68. It will further be appreciated that the light sources 62 may be disposed on independent PCBs 88 and/or a common PCB 94. Moreover, one light source 62 may be operably coupled with more than one light output window 64, 66, 68. One or more light guides 96, 98 may be used to direct light from the common light source 62 to the multiple light output windows 64, 66, 68.

The lamp assembly 30 is controlled by the controller 90 to simultaneously or independently activate the one or more light sources 62a, 62b, 62c. In some embodiments, some of the light sources (e.g., light source 62b) may emit non-visible excitation light 24 while additional light sources (e.g., light source 62a) within the lamp assembly 30 may emit light in the visible spectrum. Accordingly, some embodiments of the lamp assembly 30 described herein, may not include any luminescent structures 10.

The lamp assembly 30 may be activated in response to an occupant activating the door unlock switch on the key fob 42, when the occupant is within signal communication range of the vehicle 28. Upon activation of the door unlock switch or button, the lamp assembly 30 is activated to direct excitation light 24 towards the one or more light output windows 64, 66, 68. The lamp assembly 30 may remain on for a predetermined time period, such as two minutes, and may be turned off prior to the predetermined time period when an occupant's hand is detected by the proximity sensor 44 in close proximity to or actuating the door handle 40. Accordingly, the illumination may provide a distinct styling feature on the vehicle 28.

Figure 9:
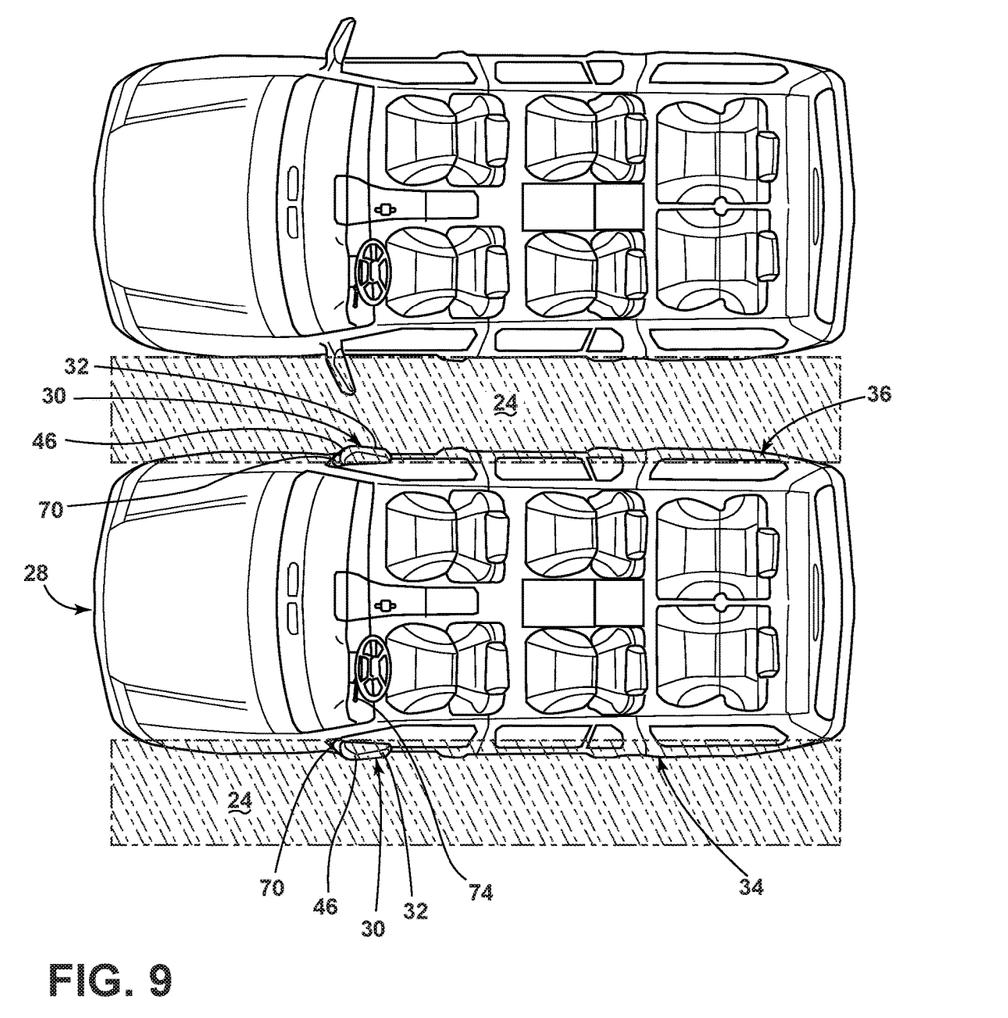
FIG. 9 is a top plan view of the vehicle having the mirror assembly in a folded position, according to one embodiment.

Referring to FIGS. 8 and 9, when the housing 46 is in the folded position, the three output windows 64, 66, 68 may direct light forwardly, downwardly, and/or rearwardly of the housing 46. Accordingly, a substantial portion of one or more lateral side portions 34, 36 of the vehicle 28 may be illuminated while the light sources 62 are activated. According to some embodiments, the light emitted from the housing 46 may be directed along the vehicle 28 and substantially below a plurality of side windows 100 disposed within the vehicle 28.

According to some embodiments, the housing 46 may maintain the folded position for a predetermined time, a predetermined distance, and/or under a predetermined speed once the vehicle engine is initiated and the vehicle 28 begins to move forwardly. Accordingly, the mirror assembly 32 may illuminate both opposing lateral side portions 34, 36 of the vehicle 28 while the driver moves the vehicle 28 from its parking space. If a transmission of the vehicle 28 is placed in reverse, the mirrors may immediately move to the deployed position for assisting the driver's rearward movement of the vehicle 28.

According to some embodiments, the mirror assembly 32 may illuminate in a plurality of colors during a welcome or farewell sequence. For instance, if one or more doors 38 of the vehicle 28 are left in an unlocked state as the occupant leaves the vehicle 28, the mirror assembly 32 may emit light of a first color (e.g., red) for a predetermined amount of time (e.g., thirty seconds). Conversely, if the doors 38 are all placed in a locked state, the mirror assembly 32 may emit light of a second color (e.g., green) for a predetermined amount of time (e.g., thirty seconds). Additionally, and/or alternatively, if one or more vehicle doors 38 are left ajar as the occupant leaves the vehicle 28, the mirror assembly 32 may emit light of any color to notify the occupant of the door position.

Figure 10:
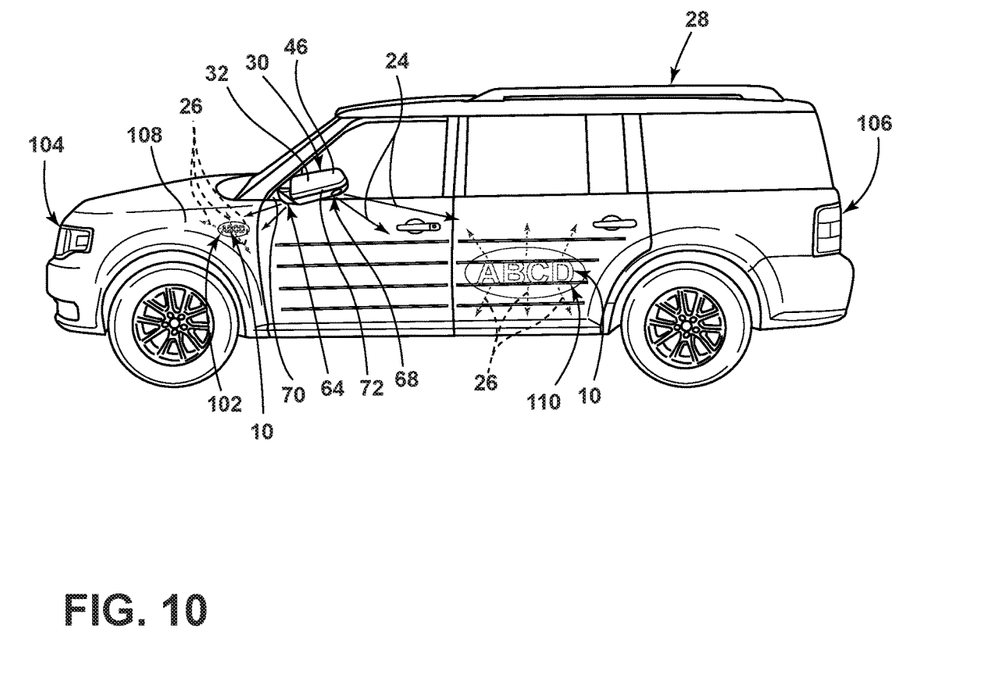
FIG. 10 is a side plan view of the vehicle having the mirror assembly in a folded position and the vehicle having one or more luminescent structures on the vehicle, according to one embodiment.

Referring to FIG. 10, a badge 102 is generally shown mounted on the vehicle 28. In other embodiments, the badge 102 may be located elsewhere, such as, but not limited to, other locations of a front portion 104, the lateral side portions 34, 36, or a rear portion 106 of the vehicle 28. Alternatively, the badge 102 may be disposed inside the vehicle 28. The badge 102 may be configured as an insignia that is presented as an identifying mark of a vehicle manufacturer, or any other desired information. In the presently illustrated embodiment, the badge 102 is located on a side fender 108 of the vehicle 28, thus allowing the badge 102 to be readily viewed by an observer looking at the one of the lateral side portions 34, 36 of the vehicle 28. The one or more light sources 62 may emit excitation light 24 that causes the luminescent structure 10 within and/or on the badge 102 to luminesce. The luminescence exhibited by the badge 102 may provide one or more distinct lighting functions. For example, the illumination may offer a unique, substantially uniform, and/or attractive viewing experience that may be difficult to duplicate through non-luminescent means.

Likewise, the vehicle 28 may include indicia 110 thereon. The indicia 110 may signify the make, model, or any other information that may be desirable to confer about the vehicle 28 to onlookers or occupants thereof. The indicia 110 may have the luminescent structure 10 that is configured to luminesce in response to receiving excitation light 24 that may be emitted from the housing 46. According to one embodiment, the indicia 110 may luminesce to indicate a company name and/or logo. For example, the indicia 110 may luminesce while the vehicle 28 is being used for commercial purposes. In some embodiments, the luminescent structure 10 defines and/or is disposed within the indicia 110 and may include a long-persistence luminescent material 18 that may luminesce in response to receiving light from the mirror assembly 32 and/or natural light sources (i.e., the sun).

According to some embodiments, the badge 102 and/or indicia 110 may include a long-persistence luminescent structure 10 and may be charged by one or more light sources 62 while the housing 46 is in the folded position. Thus, when the vehicle 28 is in use, and the mirror assembly 32 is in the deployed position, the badge 102 and/or indicia 110 may continue to luminesce.

Figure 11:
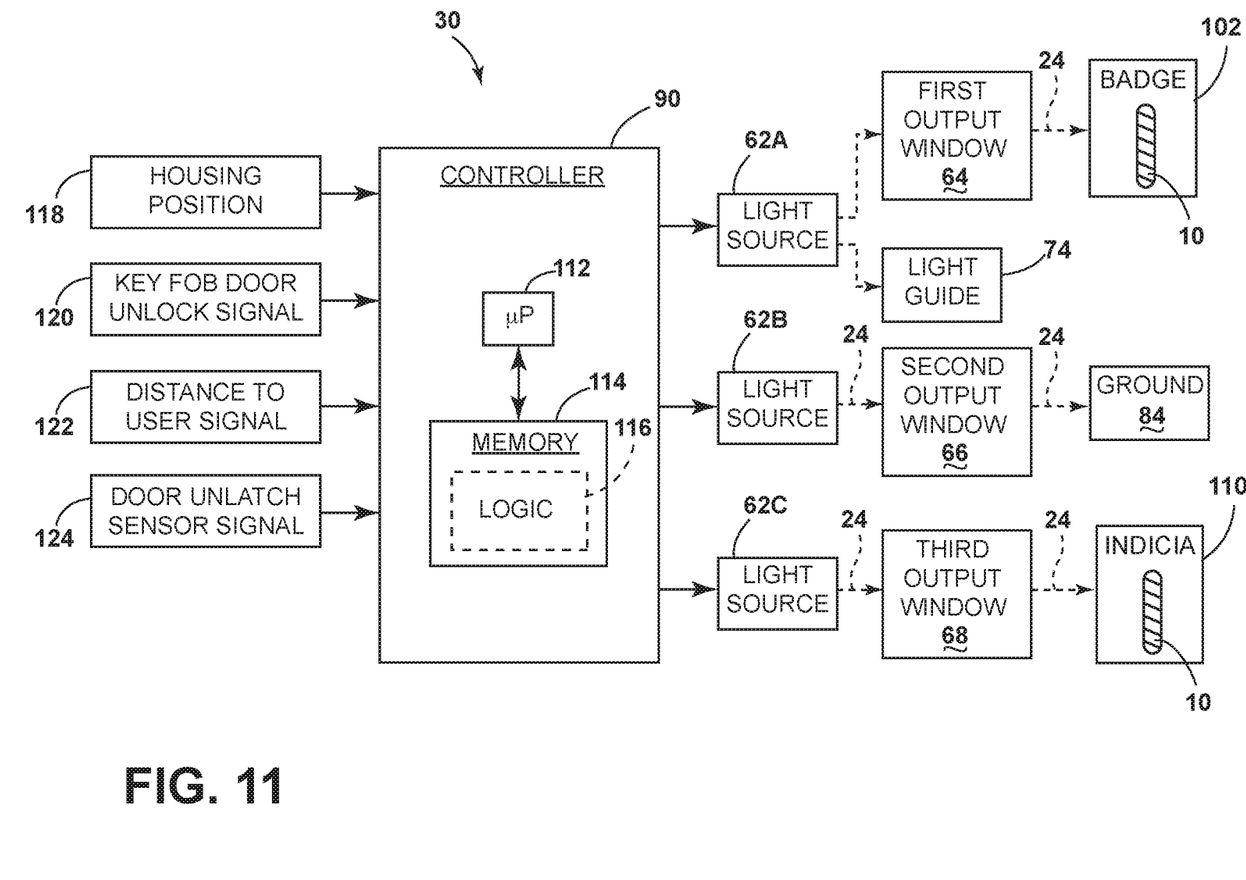
FIG. 11 is a block diagram showing the vehicle having the lamp system therein operably coupled with one or more controls within the vehicle.

Referring to FIG. 11, the lamp assembly 30 is further illustrated having the controller 90 receiving various inputs and controlling each of the light sources 62a, 62b, 62c, by applying signals to the light sources 62a, 62b, 62c. The controller 90 may include a microprocessor 112 and memory 114 as illustrated, according to one embodiment. It should be appreciated that the controller 90 may include control circuitry such as analog and/or digital control circuitry. Logic 116 is stored within memory 114 and executed by the microprocessor 112 for processing the various inputs and controlling each of the plurality of light sources 62a, 62b, 62c, as described herein. The inputs to the controller 90 may include a housing position 118 or a key fob 42 door unlock signal 120, which may be made available from another controller, e.g., body control module, within the vehicle 28 in communication with the key fob 42 via wireless communication.

The controller 90 may determine whether the housing 46 is in the deployed or folded position and activate and/or deactivate the appropriate light sources 62a, 62b, 62c based on the position. For example, according to one embodiment, when the housing 46 is disposed in the folded position, the controller 90 may deactivate the light source (e.g. 62b) that is operably coupled with the second light output window 66 and activate the light sources (e.g. 62a, 62c) that are operably coupled with the first and/or third light output windows 64, 68. Further, the light source (e.g. 62b) that is operably coupled with the second light output window 66 may be activated when the housing 46 is in the deployed position. In such instances, the second light output window 66 may serve as a puddle lamp that illuminates the ground surface 84 proximate the vehicle 28.

Additionally, the controller 90 receives a distance to user signal 122, which is a distance that the occupant is detected from the vehicle 28. The distance to the user signal may be generated by computing distance between the vehicle 28 and the key fob 42, according to one embodiment. Additionally, or alternatively, the controller 90 may include one or more of wireless communication transceivers that may be configured to interact with an electronic device. The wireless communication transceivers may communicate with the electronic device over a wireless signal (e.g., radio frequency). In one non-limiting example, the wireless communication transceivers may be a Bluetooth™ RN4020 module, or an RN4020 Bluetooth™ low energy PICtail board configured to communicate with the electronic device using Bluetooth™ low energy signals. The wireless communication transceivers may include a transmitter and a receiver to transmit and receive wireless signals (e.g., Bluetooth™ signals) to and from the electronic device, to and from the lamp assembly 30 and/or to and from the vehicle 28. It will be appreciated that the wireless communication transceivers may utilize other forms of wireless communication between with the electronic device and other wireless communication transceivers such as Wi-Fi™.

Another controller 90 such as a vehicle body control module may supply the distance to user signal 122. According to other embodiments, the distance to the user signal 122 could be generated using other sensors, such as an ultrasonic proximity sensor 44. The controller 90 further receives a door unlatch sensor signal 124. The door unlatch sensor signal 124 may be a signal sensed by the proximity sensor 44 in the door handle 40, or may be a signal detected by activation of a sensor on the key fob 42.

The controller 90 processes the inputs and activates the lamp assembly 30 by turning the plurality of light sources 62a, 62b, 62c on and off based on the illumination of desired features and/or the ground surface 84 disposed proximately to the vehicle 28. The controller 90 may activate the lamp assembly 30 in response to other signals such as a door unlock signal 120 generated by a door mounted switch or a door open signal, according to other embodiments. The lamp assembly 30 may be turned off when a predetermined time period expires or when an occupant is detected opening a vehicle door 38 via the door unlatch sensor signal 124, according to one embodiment. The controller 90 may further determine a distance from the vehicle 28 to an occupant and may control intensity and/or time of activation for each of the light sources 62a, 62b, 62c, according to other embodiments.

Referring still to FIG. 11, in operation, the luminescent structure 10 may exhibit a constant unicolor or multicolor illumination in response to receiving excitation light 24 from one or more of the light sources 62a, 62b, 62c. According to one embodiment, the luminescent structure 10 may be disposed on and/or in the badge 102 and contain a long-persistence luminescent material 18 therein. Accordingly, the badge 102 may luminesce in response to the excitation light 24 for long durations of time that may exceed one hour in some embodiments.

According to one embodiment, the controller 90 may prompt the one or more light sources 62a, 62b, 62c to emit only a first wavelength of excitation light 24 to cause the luminescent structure 10 to luminesce in the first color (e.g., blue). Alternatively, the controller 90 may prompt the one or more light sources 62a, 62b, 62c to emit only a second wavelength of excitation light 24 to cause the luminescent structure 10 to luminesce in the second color (e.g., white). Alternatively still, the controller 90 may prompt the one or more light sources 62a, 62b, 62c to simultaneously emit the first and second wavelengths of excitation light 24 to cause the luminescent structure 10 to luminesce in a third color defined by an additive light mixture of the first and second colors. Moreover, additional luminescent structures 10 may be added to the lamp assembly 30 that convert the excitation light 24 emitted from the one or more light sources 62a, 62b, 62c to a different wavelength. Alternatively still, the controller 90 may prompt the one or more light sources 62a, 62b, 62c to alternate between periodically emitting the first and second wavelengths of excitation light 24 to cause the luminescent structure 10 to periodically illuminate by alternating between the first and second colors of converted light 26. The controller 90 may prompt the one or more light sources 62a, 62b, 62c to periodically emit the first and/or second wavelengths of excitation light 24 at a regular time interval and/or an irregular time interval.

With respect to the above examples, the controller 90 may modify the intensity of the emitted first and second wavelengths of excitation light 24 by pulse-width modulation or current control. In some embodiments, the controller 90 may be configured to adjust a color of the converted light 26 by sending control signals to adjust an intensity or energy output level of the one or more light sources 62a, 62b, 62c. For example, if the one or more light sources 62a, 62b, 62c is configured to output the excitation light 24 at a low level, substantially all of the excitation light 24 may be converted to the outputted, visible converted light 26. If the one or more light sources 62a, 62b, 62c is configured to emit excitation light 24 at a high level, only a portion of the excitation light 24 may be converted to the converted light 26 by the luminescent structure 10. In this configuration, a color of light corresponding to mixture of the excitation light 24 and the converted light 26 may be output as the outputted light. In this way, each of the controllers 90 may control an output color of the outputted light.

Though a low level and a high level of intensity are discussed in reference to the excitation light 24, it shall be understood that the intensity of the excitation light 24 may be varied among a variety of intensity levels to adjust a hue of the color corresponding to the emitted excitation and/or converted light 24, 26 from the lamp assembly 30.

As described herein, the color of the converted light 26 may be significantly dependent on the particular luminescent material 18 utilized in the luminescent structure 10. Additionally, a conversion capacity of the luminescent structure 10 may be significantly dependent on a concentration of the luminescent materials 18 utilized in the luminescent structure 10. By adjusting the range of intensities that may be emitted from the one or more light sources 62a, 62b, 62c, the concentration and proportions of the luminescent materials 18 in the luminescent structure 10 and the types of luminescent materials 18 utilized in the luminescent structure 10 discussed herein may be operable to generate a range of color hues of outputted light by blending the excitation light 24 with the converted light 26. It is also contemplated that the intensity of each one or more light sources 62a, 62b, 62c may be varied simultaneously, or independently, from any number of other light sources 62a, 62b, 62c.

A variety of advantages may be derived from the use of the present disclosure. For example, use of the disclosed lamp system provides a unique aesthetic appearance to the vehicle. Moreover, the light system may provide lighting to the occupants that are approaching and/or leaving the vehicle. The light system may also provide excitation light to one or more luminescent structures that are disposed on the exterior of the vehicle. The light system may be manufactured at low costs when compared to standard vehicle lighting assemblies.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle mirror assembly, comprising:
a first light source disposed within an exterior housing and operably coupled with two light pipes and a first light output window disposed on an inboard portion of the housing, the first light output window facing a vehicle cabin when the housing is in a deployed position and vehicle forward in a folded position;
a second light source disposed within the housing and operably coupled with a second light output window disposed on a bottom portion of the housing; and
a third light source disposed within the housing and operably coupled with a third light output window disposed on an outboard portion of the housing.

2. The vehicle mirror assembly of claim 1, further comprising:
a bracket coupled to a vehicle and to the housing, wherein an electrical connector is disposed through the bracket for providing electrical power to the housing.

3. The vehicle mirror assembly of claim 1, further comprising:
a pivot assembly configured to move the housing between the deployed position and the folded position.

4. The vehicle mirror assembly of claim 3, wherein the pivot assembly is electronically controlled and rotates the housing between the deployed position and the folded position based on a predefined event.

5. The vehicle mirror assembly of claim 3, wherein the first light output window is configured to direct light vehicle forward when the housing is in the folded position.

6. The vehicle mirror assembly of claim 1, wherein one of the two light pipes extends along a vehicle forward portion of the housing.

7. The vehicle mirror assembly of claim 1, wherein the first, second, and third light sources are disposed on at least two sides of a common printed circuit board.

8. A vehicle mirror assembly, comprising:
a housing coupled to and separated from a bracket by a gap, the housing operable between deployed and folded positions; and
first and second light output windows defined by the housing,
a first light source operably coupled with two light pipes and emitting excitation light into the gap; and
a second light source emitting excitation light through the second light output window when the housing is in the deployed position.

9. The vehicle mirror assembly of claim 8, wherein the first light source is disposed on an outward portion of the housing and the second light source is disposed on a bottom portion of the housing.

10. The vehicle mirror assembly of claim 8, wherein the first or second light output window includes a luminescent structure thereon.

11. The vehicle mirror assembly of claim 10, wherein the luminescent structure includes at least one luminescent material configured to convert an excitation light into a visible converted light.

12. The vehicle mirror assembly of claim 10, further comprising:
a badge disposed on a vehicle that is illuminated by the first light source.

13. The vehicle mirror assembly of claim 8, wherein the first light source is operably coupled with a light guide for directing light through the second light output window.

14. The vehicle mirror assembly of claim 9, wherein the third light output window
is disposed on an opposing side of the housing from the first light output window.

15. A vehicle lamp assembly, comprising:
a housing attached to a bracket and operable between folded and deployed positions;
a first light source operably coupled with two separated light pipes disposed between the housing and the bracket when the housing is in the deployed position; and
a second light source disposed on an outboard portion of the housing, wherein the first and second light sources emit light vehicle forwardly and rearwardly in the folded position.

16. The vehicle lamp assembly of claim 15, wherein a luminescent structure is disposed on the first or second light source and is configured to luminesce in response to receiving an excitation light from a first light source.

17. The vehicle lamp assembly of claim 15, wherein first and second light output windows are operably coupled with respective first and second light sources.

18. The vehicle lamp assembly of claim 17, wherein the first and second light sources emit light of a first wavelength when a vehicle condition occurs and a second wavelength when the vehicle condition does not occur.

19. The vehicle lamp assembly of claim 18, wherein the vehicle condition is an actuation of a door lock system.

20. The vehicle lamp assembly of claim 19, wherein the first and second light output windows each include optics for directing excitation light in a predefined direction.

* * * * *